US012671137B2

(12) United States Patent
Orth

(10) Patent No.: US 12,671,137 B2
(45) Date of Patent: Jun. 30, 2026

(54) CELL TAB WITH AN INTEGRATED RUPTURE VALVE FOR A BATTERY CELL, AND A BATTERY CELL COMPRISING SAID CELL TAB

(71) Applicant: Dr. Ing. h.c. F. Porsche Aktiengesellschaft, Stuttgart (DE)

(72) Inventor: Christoph Orth, Marbach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 653 days.

(21) Appl. No.: 18/118,773

(22) Filed: Mar. 8, 2023

(65) Prior Publication Data

US 2023/0291066 A1     Sep. 14, 2023

(30) Foreign Application Priority Data

Mar. 9, 2022     (DE) ...................... 10 2022 105 525.6

(51) Int. Cl.
H01M 50/342 (2021.01)
H01M 10/48 (2006.01)
(Continued)

(52) U.S. Cl.
CPC ....... H01M 50/3425 (2021.01); H01M 10/48 (2013.01); H01M 50/105 (2021.01);
(Continued)

(58) Field of Classification Search
CPC ............. H01M 50/3425; H01M 10/48; H01M 50/105; H01M 2220/20; H01M 2200/20; H01M 50/574; H01M 50/578; H01M 50/30; H01M 50/35; H01M 50/358; H01M 50/367; H01M 50/533; Y02E 60/10
See application file for complete search history.

(56) References Cited

U.S. PATENT DOCUMENTS 5,273,845 A * 12/1993 McHenry ............ H01M 50/172
429/183
6,187,472 B1 * 2/2001 Shiota ................. H01M 50/578
429/57
(Continued)

FOREIGN PATENT DOCUMENTS

DE         102014211836 A1     12/2015
EP         2223375 B1 *     3/2017     .......... H01M 50/566
(Continued)

OTHER PUBLICATIONS

Great Britain Search Report for Application No. GB2303386.3, dated Sep. 4, 2023, 2 pages.

*Primary Examiner* — Jessie Walls-Murray
(74) *Attorney, Agent, or Firm* — Buchanan Ingersoll & Rooney PC

(57) ABSTRACT

A cell tab with an integrated rupture valve for a battery cell. The cell tab includes a base body having a first part and a second part. A plastic material is arranged on the surface of the base body between the first part and the second part. A first opening is arranged on the first part, and a second opening is arranged on the second part. An inner channel extends between the first opening and the second opening in the interior of the base body. A rupture disc is arranged on the second opening is gas-tight and thus provides a rupture valve.

18 Claims, 2 Drawing Sheets

A-A

(51) Int. Cl.
_H01M 50/105_ (2021.01)
_H01M 50/533_ (2021.01)
_H01M 50/578_ (2021.01)
_H01M 50/178_ (2021.01)

(52) U.S. Cl.
CPC ........ _H01M 50/578_ (2021.01); _H01M 50/178_
(2021.01); _H01M 50/533_ (2021.01); _H01M_
_2220/20_ (2013.01)

(56) References Cited

U.S. PATENT DOCUMENTS

| | | | | |
|---|---|---|---|---|
| 6,284,403 | B1 * | 9/2001 | Tsurutani | H01M 50/3425 |
| | | | | 429/57 |
| 9,716,260 | B2 | 7/2017 | Kanamori et al. | |
| 2005/0039806 | A1 | 2/2005 | Nakayama et al. | |
| 2006/0093895 | A1 | 5/2006 | Lim | |
| 2011/0223448 | A1 | 9/2011 | Kim et al. | |
| 2011/0268999 | A1 * | 11/2011 | Nagai | H01M 50/176 |
| | | | | 429/53 |
| 2012/0328913 | A1 | 12/2012 | Chuang et al. | |
| 2014/0038004 | A1 * | 2/2014 | Didra | H01M 10/04 |
| | | | | 73/723 |
| 2015/0072185 | A1 * | 3/2015 | Cho | H01M 50/562 |
| | | | | 429/56 |
| 2018/0062131 | A1 * | 3/2018 | Cho | H01M 10/052 |
| 2018/0254468 | A1 | 9/2018 | Kim et al. | |
| 2020/0212405 | A1 * | 7/2020 | Wong | H01M 50/184 |
| 2024/0106064 | A1 * | 3/2024 | Kang | H01M 50/588 |

FOREIGN PATENT DOCUMENTS

| | | | |
|---|---|---|---|
| EP | 4120458 | A1 | 1/2023 |
| JP | 2014127255 | A | 7/2014 |
| KR | 101155917 | B1 | 6/2012 |
| KR | 20160040859 | A | 4/2016 |
| KR | 20170055113 | A | 5/2017 |
| WO | 2014171293 | A1 | 10/2014 |

* cited by examiner

A-A

CELL TAB WITH AN INTEGRATED RUPTURE VALVE FOR A BATTERY CELL, AND A BATTERY CELL COMPRISING SAID CELL TAB

CROSS-REFERENCE TO RELATED APPLICATION

This application claims priority to German Patent Application No. 10 2022 105 525.6, filed Mar. 9, 2022, the content of such application being incorporated by reference herein in its entirety.

FIELD OF THE INVENTION

The present invention relates to a cell tab with an integrated rupture valve for a battery cell and a battery cell comprising said cell tab.

SUMMARY OF THE INVENTION

In the present day, the topic of electromobility is becoming increasingly important. One of the most important parameters guiding changes to electric cars is the range, which is significantly influenced by the traction battery. To achieve long ranges, a traction battery that achieves a high energy density while maintaining a relatively low net weight would be desirable.

Pouch cells are a widely used design for lithium polymer battery cells (wherein this cell chemistry is only one example of usable battery cells) and are in particular an integral part of cellular devices. These are active layers, which are stacked or folded in a pouch typically made of polypropylene, because this material is robust, particularly tear-resistant, and very elastic. Pouch cells therefore do not have a rigid outer housing, whereby they are relatively light and have a slender construction. Due to their high volumetric energy density, they are also suitable for use in traction batteries.

Despite these advantages, pouch cells have the disadvantage that a targeted degassing is currently not possible. Even during regular operation of the pouch cell, there is a build-up of gas in its interior, in particular due to ageing effects. The flammable gas substantially comprises degassing solvent, which functions as a carrier for the ions, e.g. lithium ions in the case of a lithium ion battery. Even worse consequences can be a thermal runaway, which typically releases large amounts of gas. If the positive pressure within the cell is too great, it opens or tears at the weakest sealing point in the sealing seam, which runs around the cell. Due to manufacturing, it is practically impossible to determine at which point of the sealing seam there is a weak point or even the weakest point, which will most likely function as the rupture point of the pouch in the event of an over-pressure. Because the pouch cell does not have a stable outer shell, the parts arranged adjacent to the affected cell can be destroyed by its rupture.

In light of this, one problem addressed by the present invention can be considered enabling a targeted discharging of gases from the interior of a battery cell, in particular a pouch cell.

This problem may be solved by means of a cell tab with an integrated rupture valve for a battery cell, and a battery cell equipped accordingly. Further preferred embodiments can be found in the dependent claims. The term "cell tab" to refer the cell tab of a battery cell, in particular a pouch cell, is borrowed from English.

Although the present invention is described using the example of a pouch cell, it should be clear that the cell tab according to aspects of the invention can also be used for other battery shapes and does not under any circumstances rely on the specific design of the pouch cell.

The solution according to aspects of the invention consists of providing a specific cell tab that replaces the usual cell tab known from the prior art and represents the positive pole and/or the negative pole of the cell (usually only one cell tab according to aspects of the invention is sufficient per battery cell). The cell tabs of a battery cell are usually made of copper or aluminum and are non-functional in the sense of the invention. On the other hand, the cell tab according to aspects of the invention is functional, as it provides the function of a rupture valve and consequently has a functional scope expanded beyond the usual power line. Through an internal channel that passes through the cell tab according to aspects of the invention, gas can be selectively directed outwards from the internal space of the battery cell. Through a targeted choice of the rupture disc, which covers the externally leading opening of the inner channel, a degassing of the battery cell can be carried out that can be precisely defined spatially and in time.

The present invention is particularly well-suited for pouch cells, because they have a filigree construction, and no further lines need to be introduced to the pouch cells by degassing by means of (at least) one of the cell tabs. The invention is thus characterized in that a person (at least) also selectively uses one of the two well-specified elements on which the battery voltage is tapped as a "vehicle" for degassing the battery cell. As a result, in particular, no further breakthrough location is required due to the sealing of the outer cover of the battery cell, because the exhaust channel is arranged within the cell tab.

According to aspects of the invention, there is provided a cell tab with an integrated rupture valve for a battery cell. The cell tab comprises a base body, which comprises a first part and a second part, wherein a plastic material is arranged on the surface of the base body between the first part and the second part. The base body can have a laminar, elongated shape and thus, at first glance, can essentially correspond to a conventional cell tab known from the prior art. The first part of the base body can be an inner part, which is arranged inside the battery cell when inserted into a corresponding battery cell and is not visible from the exterior. Accordingly, the second part of the base body can be an outer part, which, when inserted in a corresponding battery cell, is arranged outside of or projects out of the battery cell and via which the electrical contacting of the battery cell takes place. Between the two parts, a sealing region of the cell tab can be arranged, wherein the sealing region corresponds to the part of the base body on the surface of which the plastic material is arranged. For example, the plastic material can correspond to the material from which the outer pouch (foil outer wrapper) of a pouch cell is made, thereby facilitating the sealing process. The plastic can comprise, for example, polypropylene. During sealing, the cell tab according to aspects of the invention is placed on the edge of the pouch material such that the plastic material applied to the base body lies in the sealing region.

The cell tab according to aspects of the invention further comprises a first opening arranged on the first part and a second opening arranged on the second part. An inner channel extends inside the base body and extends between the first opening and the second opening in the interior of the base body. In other words, the two openings are connected to one another by means of the inner channel. The inner channel can be formed integrally within the cell tab, which can be produced by means of 3D printing, for example.

Finally, the cell tab comprises a rupture disc, which is arranged on the second opening, closes it in a gas-tight manner, and thus provides a rupture valve. By means of a suitable choice of the rupture disc, which functions as a classic pressure safeguard, positive pressure (if the cell tab according to aspects of the invention in a battery cell is used) at which an opening of the rupture disc is to take place in the battery cell can be adjusted.

In further embodiments of the cell tab, the plastic material can be arranged fully circumferentially on the exterior of the base body. In doing so, a reliable connection can be formed between the sealing region of the cell tab and the pouch material of the battery cell upon sealing.

In further embodiments of the cell tab, in the region of the plastic material applied to the base body, said base body comprises an extension, which extends at least to two opposite exteriors of the base body. The extension can extend laterally outward from the base body. The meaning and purpose of the extension, which can taper outward and end in a point at its end, is to provide a smooth transition of the sealing region of the outer pouch of the battery between a region where two outer pouch surfaces abut one another and a region in which one outer pouch surface abuts the plastic material of the base body.

In further embodiments of the cell tab, the extension can be trapezoidal when viewed in cross-section. The trapezoid can be isosceles. The two sides, which are not base sides, can be understood as a type of backbone on which one outer pouch side is returned from one sealing site arranged on the one base side to the other pouch side, which is arranged on the other outer pouch side.

In further embodiments of the cell tab, a weld surface for connecting anodes or cathodes of the battery cell can be arranged on the surface of the base body in the first part. For example, the cutting surface can have a textured, e.g. roughened, surface to improve the holding force of the weld.

In further embodiments of the cell tab, the first opening can be arranged between the weld face and the plastic material. The opening can be arranged relative to the surface of the first part on which the weld face is arranged, on the same side or, for example, on the opposite side. In the latter case, the cell tab according to aspects of the invention can be designed more compactly.

In further embodiments of the cell tab, a connecting surface can be arranged on the surface of the base body in the second part for the external electrical contacting of the cell tab.

According to the present invention, there is further provided a battery cell, preferably embodied as a pouch cell, wherein the connector anode or the connector cathode of the battery cell is guided outwardly by means of the cell tab according to the preceding description. If multiple active layers are arranged in the battery cell, e.g. in the form of a layer stack, of course, multiple anodes or cathodes can also be connected to the cell tab.

In further embodiments of the battery cell, the battery cell can further comprise a sensor unit configured so as to detect a rupturing (triggering) of the rupture disc. A rupturing of the disc can be considered an indication that the positive pressure within the associated battery cell has exceeded a limit value and has thus triggered the rupture valve as a pressure safeguard.

In further embodiments of the battery cell, the sensor unit can comprise a laminar element arranged at a distance from the rupture disc, which is not in electrical communication with the cell tab. Thus, the potential on the laminar element differs from the potential of the cell tab. Advantageously, the latter is well-defined for pouch cells, and there is no floating potential, such as would be the case for housings of prismatic cells. When the rupture disc ruptures, parts of the rupture disc come into contact with the laminar element, and its potential is drawn to the potential of the cell tab. Put another way, there is a short circuit between the cell tab, which is made of a conductive material, and the laminar element. This event can be detected by means of a suitably configured circuit. For example, the laminar element can be a thin grid.

If a power flow in the event of a rupture (triggering event) is undesirable, the laminar element can be provided with a dielectric material on at least the side facing the rupture disc. In this case, a rupturing of the rupture disc can be capacitively detected, because in the rupture, the charge-bearing layer is destroyed in the form of the rupture disc, and thus the capacity of the system consisting of rupture disc and laminar element is abruptly decreased.

It is understood that the aforementioned features and the features yet to be explained in the following can be used not only in the respectively specified combination, but also in other combinations or on their own, without leaving the scope of the present invention.

BRIEF DESCRIPTION OF THE DRAWINGS

Additional advantages and configurations of the invention follow from the description and the enclosed drawings.

DETAILED DESCRIPTION OF THE INVENTION

Figure 1:
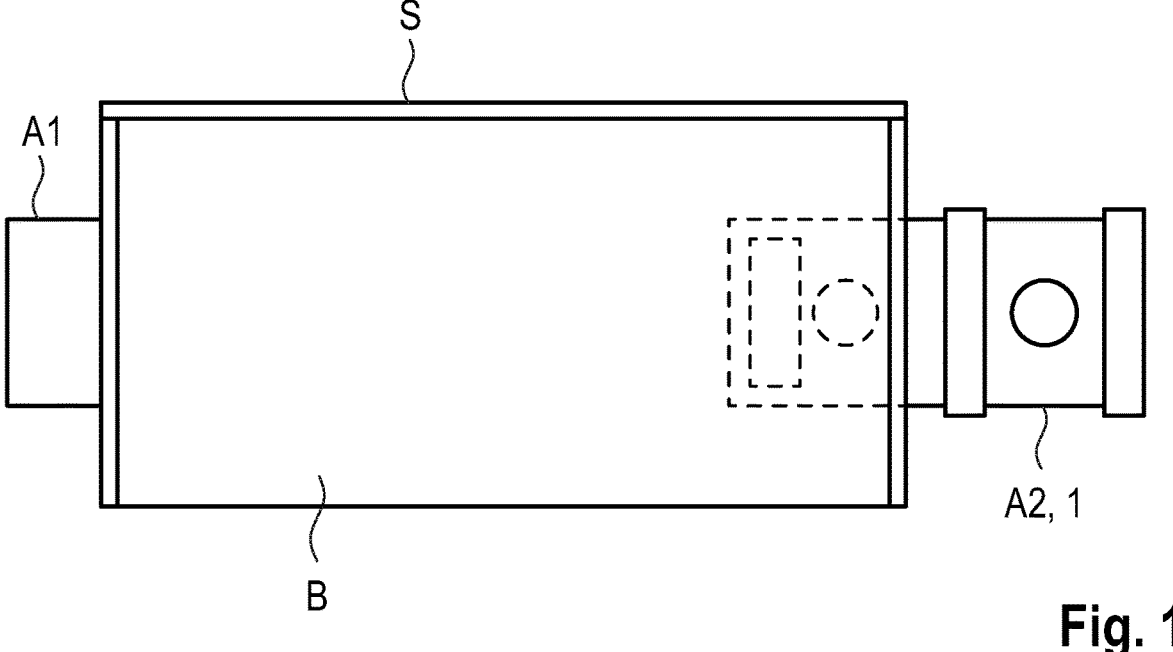
FIG. 1 shows a schematic plan view of an embodiment of a battery cell according to aspects of the invention, here a pouch cell.

FIG. 1 shows a schematic representation of an embodiment example of a battery cell B according to aspects of the invention, in this case a pouch cell. The battery cell B comprises a first cell tab A1, which can correspond to the anode of the battery cell B, for example, and a second cell tab A2, which can correspond to the cathode, wherein the assignment of the cell tabs A1, A2 to the anode and cathode is arbitrary. The second cell tab A2 is also in the form of the cell tab 1 according to aspects of the invention, which will be described in further detail below with reference to FIGS. 2 and 3. The battery cell B comprises a circumferential sealing seam S, which extends over three sides of the battery cell B. The fourth side is free of a sealing seam, as this side is naturally assembled by bending a foil material or has no opening.

Figure 2:
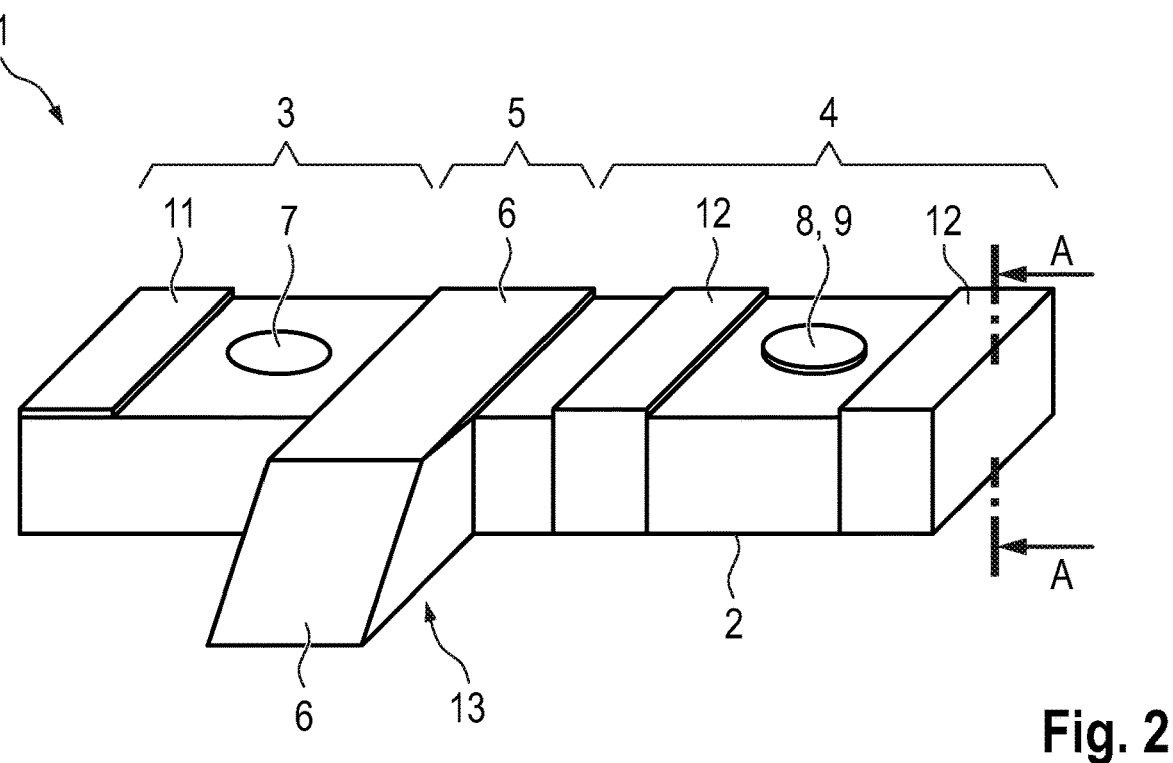
FIG. 2 shows a perspective schematic view of a cell tab according to aspects of the invention.
Figure 3:
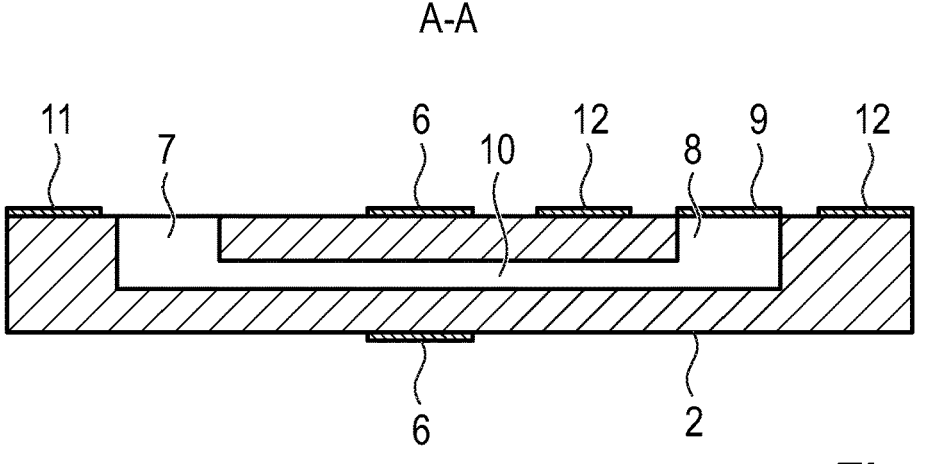
FIG. 3 shows a cross-sectional view along line A-A through the embodiment of the cell tab according to aspects of the invention shown in FIG. 2.

One embodiment of the cell tab 1 according to aspects of the invention is illustrated in greater detail in FIG. 2. In FIG. 3, the embodiment example of the cell tab according to aspects of the invention illustrated in FIG. 2 is shown in cross-section along line A-A drawn in FIG. 2.

The cell tab 1 according to aspects of the invention comprises a base body 2, which is substantially divided into three parts and comprises a first part 3 and a second part 4, wherein a plastic material 6 is arranged on the surface of the base body 2 between the first part 3 and the second part 4.

The plastic material 6 simultaneously defines a sealing region 5, which is arranged between the first and second parts 3, 4. In the example shown, the sealing region 5 is configured so as to be laterally widened relative to the remaining region of the cell tab 1. The extension 13 shown on one side is also configured on the other side of the base body 2, but is not visible due to the perspective. Preferably, the plastic material 6 can be arranged fully on the sealing region 5, including the extension 13.

A first opening is arranged in the first part 3 of the base body 2. Similarly, a second opening 8 is arranged in the second part 4 of the base body 2. An inner channel 10 extends inside the base body 2 between the first opening 7 and the second opening 8. A rupture disc 9 is arranged on the second opening 8, which closes the second opening 8 in a gas-tight manner and thus provides a rupture valve. A weld surface 11 is arranged in the first part 3 for connecting anodes or cathodes of the battery cell on a surface of the base body 2. Connecting surfaces 12 are arranged on the surface of the base body 2 on the second part 4 for the external electrical contacting of the cell tab 1, wherein only one of these can also be provided.

The cell tab 1 according to aspects of the invention can be used instead of a conventional cell tab (see e.g. cell tab A1 in FIG. 1) and represents a rupture valve that is well-defined both spatially and in time (relative to the triggering condition). In the case of the battery cell B illustrated in FIG. 1, if the pressure in the interior increases above a threshold value that corresponds to the rupture pressure of the rupture disc 9, the rupture disc opens and the gas can escape from the interior of the battery cell B. By means of the aforementioned sensor unit, for example the laminar element (not explicitly shown in the figures) which is arranged over the rupture disc 9, a rupture of the rupture disc 9 can be detected. This allows a battery cell within a battery module that has suffered damage and is henceforth no longer available for use in power supply to be precisely detected.

What is claimed is:

1. A cell tab having an integrated rupture valve for a battery cell, said cell tab comprising:
a base body including a rectangular shaped first part and a rectangular shaped second part;
a plastic material arranged on an outer surface of the base body at a location between the first part and the second part;
a first opening arranged on the first part;
a second opening arranged on the second part, wherein the second opening is parallel to and spaced apart from the first opening;
an inner channel disposed in an interior of the base body, the inner channel extending between the first opening and the second opening, wherein the inner channel extends perpendicularly with respect to the first and second openings;
a rupture disc arranged over the second opening to close the second opening in a gas-tight manner, and thereby constituting a rupture valve; and
a first channel extending from the first opening arranged on the first part, and a second channel extending from the second opening arranged on the second part, wherein the second channel is parallel to and spaced apart from the first channel, and wherein the first and second channels are interconnected with the inner channel, wherein the inner channel extends between the first channel and the second channel, and wherein the inner channel extends perpendicularly with respect to the first and second channels.

2. The cell tab according to claim 1, wherein the plastic material is arranged fully circumferentially on an exterior of the base body.

3. The cell tab according to claim 1, wherein, in a region of the plastic material applied to the base body, said base body comprises an extension, which extends at least to two opposite exteriors of the base body.

4. The cell tab according to claim 3, wherein the extension is trapezoidal when viewed in cross-section.

5. The cell tab according to claim 1, wherein a weld surface is arranged in the first part for connecting anodes or cathodes of the battery cell on the outer surface of the base body.

6. The cell tab according to claim 5, wherein the first opening is arranged between the weld surface and the plastic material.

7. The cell tab according to claim 1, wherein, in the second part, a connection surface is arranged on the outer surface of the base body for external electrical contacting of the cell tab.

8. A battery cell embodied as a pouch cell, wherein a connector anode or a connector cathode of the battery cell is guided outwardly by way of the cell tab according to claim 1.

9. The battery cell according to claim 8, further comprising a sensor unit configured to detect rupturing of the rupture disc.

10. The battery cell according to claim 9, wherein the sensor unit comprises a laminar element arranged at a distance from the rupture disc and not in electrical connection with the cell tab.

11. A battery cell comprising the cell tab of claim 1.

12. A battery comprising the battery cell of claim 11.

13. A motor vehicle comprising the battery of claim 12.

14. The cell tab according to claim 1, wherein a weld surface is arranged on the outer surface of the first part for connecting anodes or cathodes of the battery cell, and a connection surface is arranged on the outer surface of the second part for external electrical contacting of the cell tab.

15. The cell tab according to claim 14, wherein the first opening is arranged between the weld surface and the plastic material.

16. The cell tab according to claim 14, further comprising two of the connection surfaces arranged on the surface of the second part, wherein the second opening is positioned between the two connection surfaces.

17. The cell tab according to claim 16, wherein the inner channel extends beneath one of the two connection surfaces and the plastic material.

18. A cell tab having an integrated rupture valve for a battery cell, said cell tab comprising:
a base body including a rectangular shaped first part and a rectangular shaped second part;
a plastic material arranged on an outer surface of the base body at a location between the first part and the second part;
a first opening arranged on the first part;
a second opening arranged on the second part, wherein the second opening is parallel to and spaced apart from the first opening;
an inner channel disposed in an interior of the base body, the inner channel extending between the first opening and the second opening, wherein the inner channel extends perpendicularly with respect to the first and second openings; and a rupture disc arranged over the second opening to close the second opening in a gas-tight manner, and thereby constituting a rupture valve, wherein, in a region of the plastic material applied to the base body, said base body comprises an extension which extends at least to two opposite exteriors of the base body, wherein the extension is trapezoidal when viewed in cross-section, wherein the plastic material extends about a perimeter of the extension.

* * * * *